(12) United States Patent
Chen et al.

(10) Patent No.: US 12,265,215 B2
(45) Date of Patent: Apr. 1, 2025

(54) DIFFRACTIVE OPTICAL ELEMENT FOR BEAM SPLITTING AND DESIGN METHOD THEREFOR, AND STRUCTURED LIGHT PROJECTOR

(71) Applicant: JIAXING UPHOTON OPTOELECTRONICS TECHNOLOGY CO., LTD., Zhejiang (CN)

(72) Inventors: Peng Chen, Zhejiang (CN); Zhentao Fan, Zhejiang (CN); Muyun Wang, Zhejiang (CN); Lixin Wei, Zhejiang (CN); Lei Sui, Zhejiang (CN)

(73) Assignee: JIAXING UPHOTON OPTOELECTRONICS TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 18/725,508

(22) PCT Filed: Nov. 24, 2022

(86) PCT No.: PCT/CN2022/134006
§ 371 (c)(1),
(2) Date: Jun. 28, 2024

(87) PCT Pub. No.: WO2023/124667
PCT Pub. Date: Jul. 6, 2023

(65) Prior Publication Data
US 2025/0067975 A1  Feb. 27, 2025

(30) Foreign Application Priority Data

Dec. 31, 2021 (CN) .......................... 202111663225.1

(51) Int. Cl.
G02B 27/00 (2006.01)
G02B 27/10 (2006.01)
G03B 21/20 (2006.01)

(52) U.S. Cl.
CPC ..... G02B 27/0012 (2013.01); G02B 27/1086 (2013.01); G03B 21/2033 (2013.01)

(58) Field of Classification Search
CPC ............ G02B 27/0012; G02B 27/1086; G02B 27/1093; G03B 21/2033
See application file for complete search history.

(56) References Cited

U.S. PATENT DOCUMENTS 9,124,066 B2 * 9/2015 Sridharan ............. H01S 3/0085
9,373,928 B2 * 6/2016 Sridharan ........... H01S 3/10023
(Continued)

FOREIGN PATENT DOCUMENTS

CN 106569330 A 4/2017
CN 107026392 A 8/2017
(Continued)

*Primary Examiner* — Bao-Luan Q Le
(74) *Attorney, Agent, or Firm* — Meunier Carlin & Curfman LLC (57) ABSTRACT

A design method for a diffractive optical element for beam splitting, comprising: S11, determining an input light field distribution and a target output light field distribution of a diffractive optical element; S12, constructing a beam splitting lattice of the diffractive optical element, wherein the light splitting lattice is used for performing array replication on light sources to realize the speckle lattice in a specific field of view, and the arrangement mode of the beam splitting lattice is regular arrangement or longitudinal and/or transverse periodic staggered arrangement; S13, disturbing the beam splitting lattice to reduce a deviation between an actual output light field and the target output light field, and limiting the disturbance quantity to ensure that there is no obvious overlap or gap between adjacent blocks in the (Continued)

speckle lattice; and S14, designing the diffractive optical element according to the disturbed beam splitting lattice.

20 Claims, 10 Drawing Sheets

(56) References Cited

U.S. PATENT DOCUMENTS

| | | | | |
|---|---|---|---|---|
| 9,443,310 | B2* | 9/2016 | Hudman | A63F 13/833 |
| 9,959,465 | B2* | 5/2018 | Georgiou | G01B 11/22 |
| 10,605,654 | B2* | 3/2020 | Manger | G02B 27/106 |
| 11,054,305 | B2* | 7/2021 | Manger | B23K 26/04 |
| 11,863,868 | B1* | 1/2024 | Gross | G06T 7/0002 |
| 2013/0294468 | A1* | 11/2013 | Sridharan | H01S 3/10053 |
| | | | | 372/29.02 |
| 2014/0307307 | A1* | 10/2014 | Georgiou | H04N 25/611 |
| | | | | 359/558 |
| 2015/0097947 | A1* | 4/2015 | Hudman | G01S 7/4863 |
| | | | | 348/136 |
| 2015/0340835 | A1* | 11/2015 | Sridharan | H01S 3/1307 |
| | | | | 359/341.1 |
| 2017/0188016 | A1* | 6/2017 | Hudman | A63F 13/816 |
| 2018/0202860 | A1* | 7/2018 | Manger | G01J 1/0411 |
| 2018/0218210 | A1* | 8/2018 | Georgiou | H04N 23/56 |
| 2019/0273905 | A1 | 9/2019 | Wang et al. | |
| 2020/0004036 | A1* | 1/2020 | Sales | G02B 5/18 |
| 2020/0088571 | A1* | 3/2020 | Manger | G01J 1/0418 |
| 2020/0192206 | A1* | 6/2020 | Li | G03B 21/145 |
| 2020/0355494 | A1 | 11/2020 | Rossi | |
| 2024/0168202 | A1* | 5/2024 | Macpherson | G02B 5/0268 |

FOREIGN PATENT DOCUMENTS

| | | |
|---|---|---|
| CN | 111295614 A | 6/2020 |
| CN | 114371554 A | 4/2022 |
| EP | 3623851 A2 | 3/2020 |

* cited by examiner

10

S11
Determining an input light field distribution and a target output light field distribution of the diffractive optical element, the input light field distribution including a parameter and arrangement of a light source, and the target output light field being a speckle array with uniform light splitting or energy distribution distributed regularly from a center to an edge

S12
Constructing a light-splitting point array of the diffractive optical element, the light-splitting point array being used to perform array replication on the light source to realize a speckle array within a specific field of view, and the arrangement of the light-splitting point array being a regular arrangement or a longitudinal and/or transverse periodic misalignment arrangement

S13
Disturbing the light-splitting point array to reduce a deviation between an actual output light field and the target output light field, and limiting an amount of disturbance of the disturbing method to ensure that there is no obvious overlap or gap between adjacent blocks in the speckle array

S14
Designing the diffractive optical element by using a scalar GS algorithm according to the disturbed light-splitting point array; wherein the disturbing includes moving at least some of points in the light-splitting point array

DIFFRACTIVE OPTICAL ELEMENT FOR BEAM SPLITTING AND DESIGN METHOD THEREFOR, AND STRUCTURED LIGHT PROJECTOR

CROSS REFERENCE TO RELATED APPLICATIONS

The present disclosure is a National Stage of International Application No. PCT/CN2022/134006, filed Nov. 24, 2022, which claims priority to the Chinese patent application No. 202111663225.1 filed on Dec. 31, 2021.

TECHNICAL FIELD

The present disclosure relates to the field of diffractive optical technologies, and in particular to a design method of a diffractive optical element for beam splitting, a diffractive optical element for beam splitting designed according to the design method, and a structured light projector.

BACKGROUND

For binocular vision or 3D structured light applications, a recognition algorithm requires that a speckle array projected by a projector has a high degree of randomness. Regardless of whether there is a collimated or uncollimated projector scheme, the speckle array projected by a module is obtained by replicating a multi-point Vertical Cavity Surface Emitting Laser (VCSEL) light source through a Diffractive Optical Element (DOE) light-splitting point array device. The arrangement of the light points of the multi-point VCSEL light source itself is random. In order to make the speckles after replication through DOE also have randomness, special requirements are put forward for the arrangement of the DOE light-splitting point array.

In addition, in 3D recognition systems such as binocular vision, structured light, and Time of Flight (ToF), the depth recognition algorithm has high non-uniformity requirements for the projected speckle array, and the non-uniformity of the speckle array mainly depends on the beam splitting non-uniformity of the beam splitting device. Therefore, in the design process of the beam splitting device, it is necessary to make the energies of respective beam splitting points as close as possible, that is, the non-uniformity of the speckle array energy is made as low as possible, which puts forward high requirements on the design method of the beam-splitting point array. The scalar Gerchberg-Saxton algorithm (GS algorithm) can be used to design a point array with low non-uniformity, but in the case of a large field of view, the characteristic size of the microstructure has reached the magnitude of wavelength. At this time, the speckle array non-uniformity will deteriorate due to the existence of the vector effect. Therefore, it is necessary to further improve the scalar-based point array design method.

The content of the Background section discloses merely the technology known to the inventor and does not necessarily represent the prior art in this field.

SUMMARY

In view of one or more existing deficiencies, the present disclosure is directed to a design method for a diffractive optical element for beam splitting, including:

S11: determining an input light field distribution and a target output light field distribution of the diffractive optical element, the input light field distribution including a parameter and arrangement of a light source, and the target output light field being a speckle array with uniform light splitting or energy distribution distributed regularly from a center to an edge;

S12: constructing a light-splitting point array of the diffractive optical element, the light-splitting point array being used to perform array replication on the light source to realize a speckle array within a specific field of view, and an arrangement of the light-splitting point array being a regular arrangement or a longitudinal and/or transverse periodic misalignment arrangement;

S13: disturbing the light-splitting point array to reduce a deviation between an actual output light field and the target output light field, and limiting an amount of disturbance of the disturbing method to ensure that there is no obvious overlap or gap between adjacent blocks in the speckle array; and S14: designing the diffractive optical element by using a scalar GS algorithm according to the disturbed light-splitting point array;

wherein the disturbing includes moving at least some of points in the light-splitting point array.

According to one aspect of the present disclosure, step S13 includes: disturbing the light-splitting point array transversely to reduce non-uniformity of the actual output light field.

According to one aspect of the present disclosure, amounts of transverse disturbance for at least one column of points in the light-splitting point array are roughly symmetrical around a center of the column.

According to one aspect of the present disclosure, the step S13 includes: disturbing the light-splitting point array longitudinally to reduce non-uniformity of the actual output light field.

According to one aspect of the present disclosure, amounts of longitudinal disturbance for at least one row of points in the light-splitting point array are roughly symmetrical around a center of the row.

According to one aspect of the present disclosure, the step S13 includes: disturbing the light-splitting point array transversely and longitudinally to reduce non-uniformity of the actual output light field.

According to one aspect of the present disclosure, amounts of disturbance for respective points in the light-splitting point array are roughly symmetrical around a center of the point array.

According to one aspect of the present disclosure, the step S13 includes: disturbing randomly at least some of the points transversely and/or longitudinally to reduce non-uniformity of the actual output light field.

According to one aspect of the present disclosure, when the diffractive optical element is quantized in two steps, the step S13 further includes: keeping a center point of the light-splitting point array unmovable.

According to one aspect of the present disclosure, when the diffractive optical element is quantized in $2^n$ steps, n being a positive integer greater than 1, amounts of disturbance for the light-splitting point array are non-centrosymmetric.

According to one aspect of the present disclosure, the target output light field is a speckle array with a distribution of $1:1/(\cos(\theta_i))^P$, wherein $\theta_i$ is an angle between an i-th light-splitting point and an optical axis.

According to one aspect of the present disclosure, step S12 includes: constructing a light-splitting point array of the diffractive optical element, the light-splitting point array being used to perform array replication on a single-point or multi-point VCSEL light source to realize a speckle array within a specific field of view, and the arrangement of the light-splitting point array being a regular arrangement or a longitudinal 1/M and/or transverse 1/N misalignment arrangement, wherein M and N are both positive integers greater than 2.

According to one aspect of the present disclosure, the input light field is a light field formed by a randomly arranged multi-point VCSEL light source.

According to one aspect of the present disclosure, step S14 further includes: when the input light field is divergent light, superimposing a function of a collimator lens in the diffractive optical element.

The present disclosure further relates to a diffractive optical element for beam splitting designed according to the above-mentioned design method.

The present disclosure further relates to a structured light projector, including:
 a VCSEL light source configured to generate laser light; and
 a diffractive optical element designed according to the above-mentioned design method and configured to perform beam splitting on the laser light.

The design method of the present disclosure can realize the design of the light-splitting point array with lower non-uniformity based on the scalar design method by disturbing each target order according to the preset condition and then performing a scalar design to construct the light-splitting point array of the diffractive optical element. Therefore, the diffractive optical element designed by the present disclosure can effectively reduce the non-uniformity of the output light field.

BRIEF DESCRIPTION OF THE DRAWINGS

The accompanying drawings constituting a part of the present disclosure are used to provide a further understanding of the present disclosure. The illustrative embodiments of the present disclosure and the descriptions thereof are used to explain the present disclosure and do not constitute improper limitations on the present disclosure. In the accompanying drawings.

DETAILED DESCRIPTION

In the following, only certain exemplary embodiments are briefly described. As can be appreciated by those skilled in the art, the described embodiments can be modified in various different ways without departing from the spirit or scope of the present disclosure. Therefore, the drawings and descriptions are considered to be illustrative in nature and not restrictive.

In the description of the present disclosure, it should be understood that the terms "center", "longitudinal", "transverse", "length", "width", "thickness", "up", "down", "front", "back", "left", "right", "vertical", "horizontal", "top", "bottom", "inner", "outer", "clockwise", "counterclockwise" and the like indicate the orientation or positional relationship based on the orientation or position relationship shown in the drawings, which is only for the convenience of describing the present disclosure and simplifying the description, rather than indicating or implying that the device or element referred to must have a specific orientation, be constructed and operated in a specific orientation, and therefore cannot be understood as a limitation of the present disclosure. In addition, the terms "first" and "second" are used only for descriptive purposes and cannot be understood as indicating or implying relative importance or implicitly indicating the number of technical features indicated. Thus, the features defined by "first" and "second" may explicitly or implicitly include one or more of the stated features. In the description of the present disclosure, "multiple" means two or more, unless otherwise clearly defined.

In the description of the present disclosure, it should be noted that, unless otherwise clearly defined and limited, the terms "installation", "connection", and "connection to each other" should be understood in a broad sense. For example, it can be a fixed connection, a detachable connection, or an integral connection, or it can be a mechanical connection, an electrical connection, or a mutual communication, or it can be a direct connection or an indirect connection through an intermediate medium, or it can be the internal connection of two elements or the interaction relationship between two elements. For an ordinary skilled person in the art, the specific meanings of the above terms in the present disclosure can be understood according to specific circumstances.

In the present disclosure, unless otherwise clearly specified and defined, the first feature being "on" or "beneath" the second feature may include the first and second features being in direct contact, or the first and second features being not in direct contact but in contact via another feature between them. Moreover, the first feature "on", "above", and "over" the second feature includes the first feature being directly above and obliquely above the second feature, or simply indicates that the level of the first feature is higher than that of the second feature. The first feature "beneath", "below" and "under" the second feature includes the first feature being directly below and obliquely below the second feature, or simply indicates that the level of the first feature is lower than that of the second feature.

The disclosure below provides many different embodiments or examples for implementing different structures of the present disclosure. In order to simplify the disclosure, the components and settings of specific examples are described below. Of course, they are only examples and are not intended to limit the present disclosure. In addition, the present disclosure may repeat reference numbers and/or reference letters in different examples. Such repetition is for the purpose of simplification and clarity, and does not itself indicate the relationship between the various embodiments and/or settings discussed. In addition, the present disclosure provides examples of various specific processes and materials, but a person of ordinary skill in the art may be aware of the application of other processes and/or the use of other materials.

The preferred embodiments of the present disclosure are described below in conjunction with the accompanying drawings. It should be understood that the preferred embodiments described herein are only used to illustrate and explain the present disclosure, and are not intended to limit the present disclosure.

Figure 1:
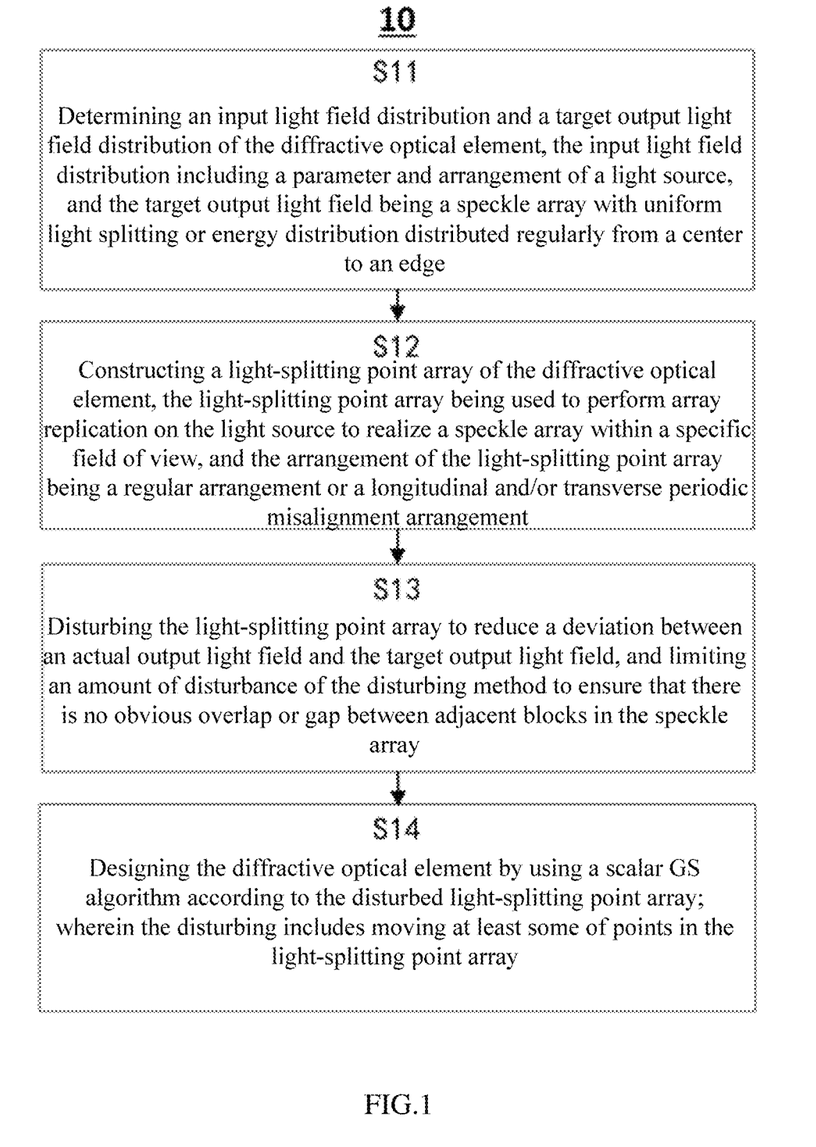
FIG. 1 shows a flow chart of a design method of a diffractive optical element for beam splitting according to an embodiment of the present disclosure.

FIG. 1 shows a flow chart of a design method for a diffractive optical element for beam splitting according to an embodiment of the present disclosure. The design method 10 includes the followings.

In step S11, the input light field distribution and the target output light field distribution of the diffractive optical element are determined. The input light field distribution includes a parameter and arrangement of a light source. The target output light field is a speckle array with uniform light splitting or an energy distribution regularly distributed from a center to an edge. The design of the diffractive optical element for beam splitting is to design the arrangement of the light-splitting point array of the diffractive optical element given the input light field distribution and the output light field distribution, and then modulate the input light field through the diffractive optical element so that the actual output light field is close to the target output light field with a high precision.

Figure 2:
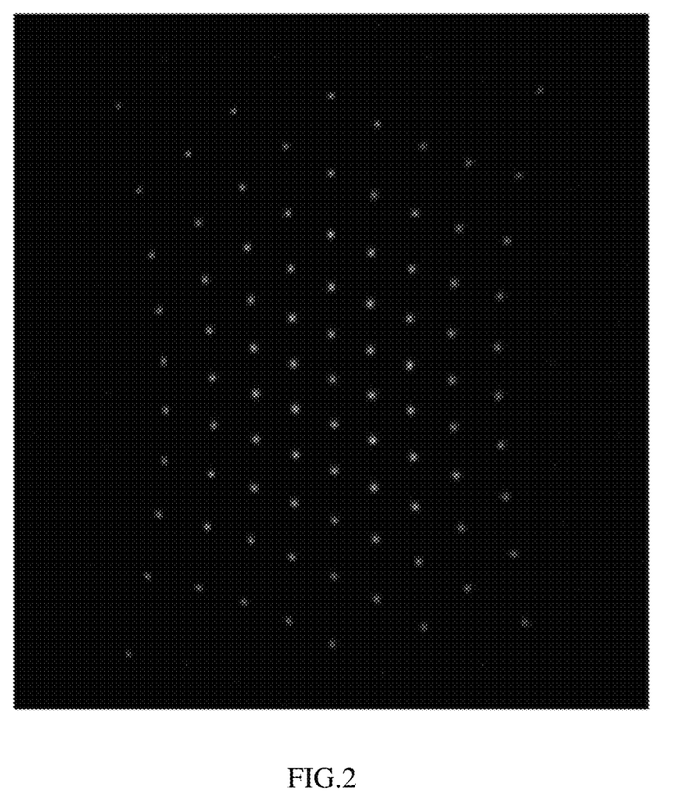
FIG. 2 shows a schematic diagram of an output light field distribution formed by a single-point VCSEL light source after passing through a diffractive optical element according to an embodiment of the present disclosure.
Figure 3:
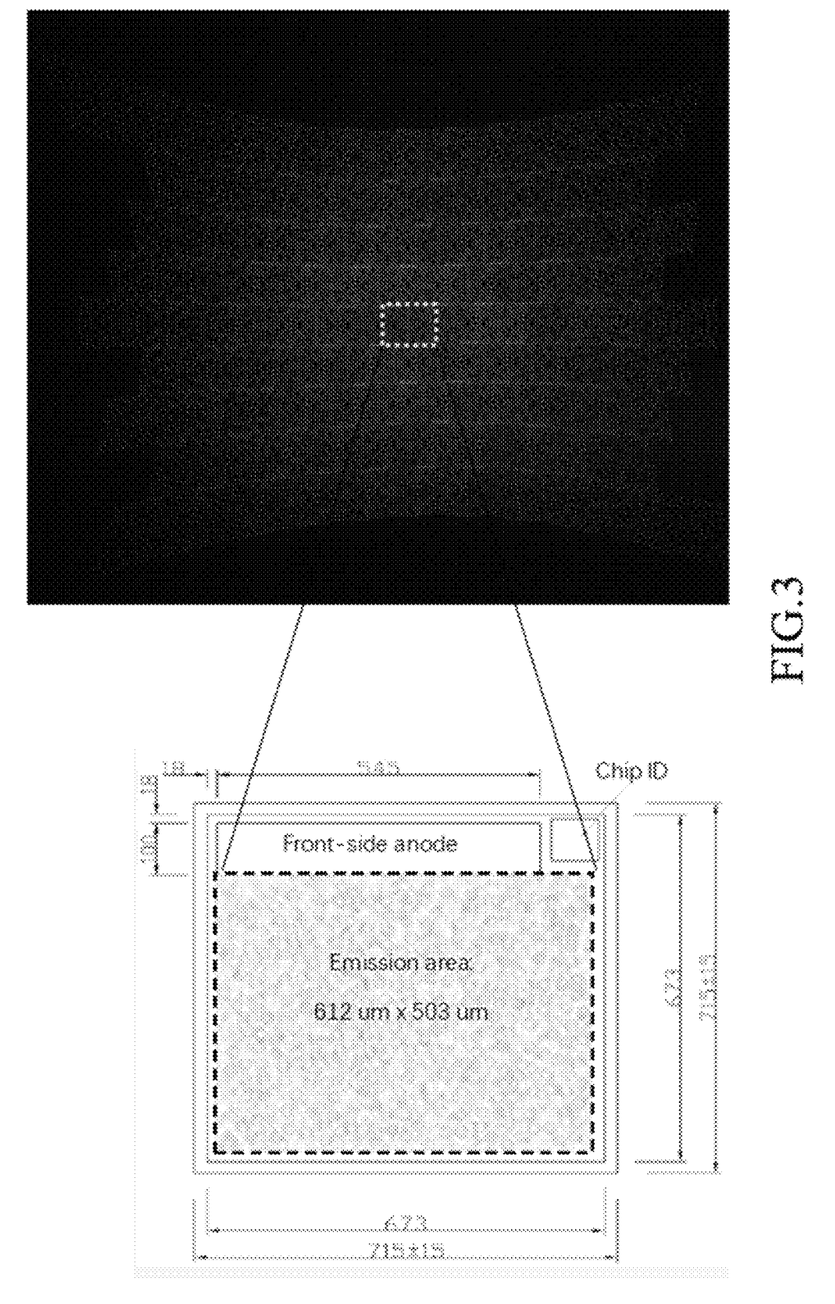
FIG. 3 shows a schematic diagram of an output light field distribution formed by a multi-point VCSEL light source after passing through a diffractive optical element according to an embodiment of the present disclosure.

According to a preferred embodiment of the present disclosure, the input light field is a light field formed by a randomly arranged multi-point VCSEL light source. When determining the input light field distribution, the parameters of the light source include, for example, the number and type of light source. FIG. 2 shows a schematic diagram of the output light field distribution formed by a single-point VCSEL light source after passing through a diffractive optical element according to an embodiment of the present disclosure, wherein a laser beam emitted by the single-point VCSEL light source forms a speckle array after passing through a diffractive optical lens. FIG. 3 shows a schematic diagram of the output light field distribution formed by a multi-point VCSEL light source after passing through a diffractive optical element according to an embodiment of the present disclosure, wherein multiple laser beams emitted by the multi-point VCSEL light source form a speckle array (blocks) after passing through a diffractive optical lens. In order to reduce the non-uniformity of the output light field, the randomly arranged multi-point VCSEL light source is preferably used as the light source of the input light field.

According to a preferred embodiment of the present disclosure, the target output light field is a speckle array distributed at $1:1/(\cos(\theta_i))^P$, where $\theta_i$ is an angle between the i-th light-splitting point and the optical axis. The energy compensation at large angles performed in the design stage of the diffractive optical element is mainly used to compensate for the attenuation of the signal energy at large angles caused by the processing technology, and the P value is determined by the process capability of the processing platform. The number of light-splitting points and the angular distribution of the output light field are jointly determined by the speckle field requirements after the input light field is replicated by the diffractive optical element, the size of the multi-point VCSEL light source, and the focal length of a collimator lens.

Figure 4:
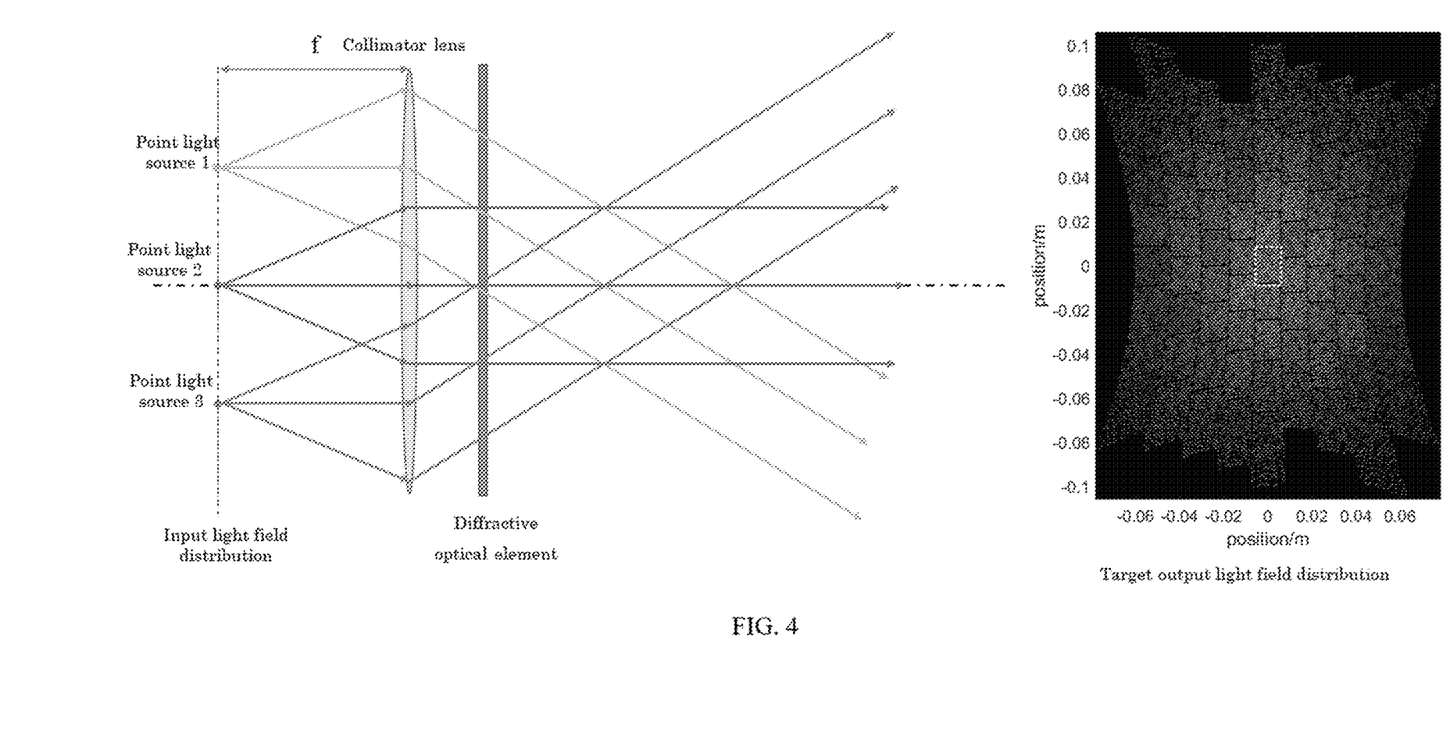
FIG. 4 shows a schematic diagram of input light field and output light field distributions according to an embodiment of the present disclosure.

FIG. 4 shows a schematic diagram of the input light field and output light field distributions of an embodiment of the present disclosure, where the input light field is a column of point light sources arranged longitudinally: a point light source 1, a point light source 2, and a point light source 3. The target output light field is a speckle array distributed regularly from the center to the edge.

According to a preferred embodiment of the present disclosure, the design method 10 further includes: when the input light field is divergent light, a function of a collimator lens is superimposed in the diffractive optical element. Continuing to refer to FIG. 4, the three point light sources all emit divergent light, which are incident on the diffractive optical element after passing through the collimator lens to become the collimated parallel light. Therefore, the design method 10 can be used for both the design of the diffractive optical element for collimated light and the design of the diffractive optical element for divergent light. FIG. 4 is only an exemplary illustration, and the collimator lens and the diffractive optical element are arranged separately. In fact, in the design method 10, it is sufficient to superimpose the function of the collimator lens into the design of the diffractive optical element.

In step S12, a light-splitting point array of a diffractive optical element is constructed. The light-splitting point array is used to perform array replication on the light source to realize a speckle array within a specific field of view. The arrangement of the light-splitting point array is a regular arrangement or a longitudinal and/or transverse periodic misalignment arrangement. Continuing to refer to FIG. 4, the range of the specific field of view is the range of the target output light field distribution diagram. The light-splitting point array of the diffractive optical element performs array replication on the three point light sources arranged in the longitudinal direction to form a 9×9 speckle array. Due to the existence of the vector effect, there is a deviation between the actual output light field distribution and the target output light field distribution, resulting in a low non-uniformity of the speckle array.

The light-splitting point array of the diffractive optical element can be arranged in a regular manner or in a periodic misalignment manner.

According to a preferred embodiment of the present disclosure, step S12 includes: constructing the light-splitting point array of the diffractive optical element, where the light-splitting point array is used to perform array replication on a single-point or multi-point VCSEL light source to realize a speckle array within a specific field of view, and the arrangement of the light-splitting point array is a regular arrangement or a longitudinal 1/M and/or transverse 1/N misalignment arrangement, wherein M and N are both positive integers greater than 2.

Figure 5A:
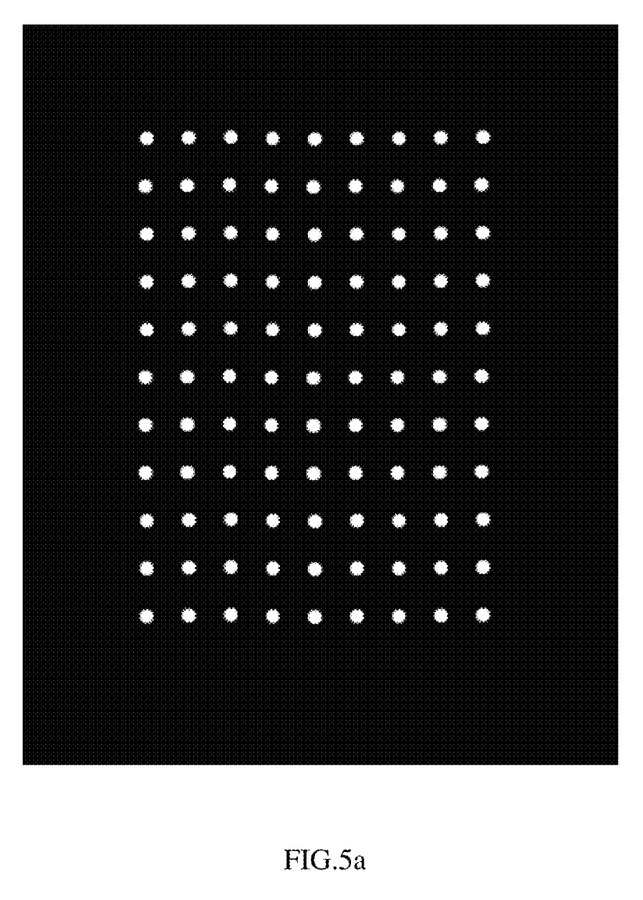
FIG. 5a shows a schematic diagram of a regularly arranged light-splitting point array according to an embodiment of the present disclosure.
Figure 5B:
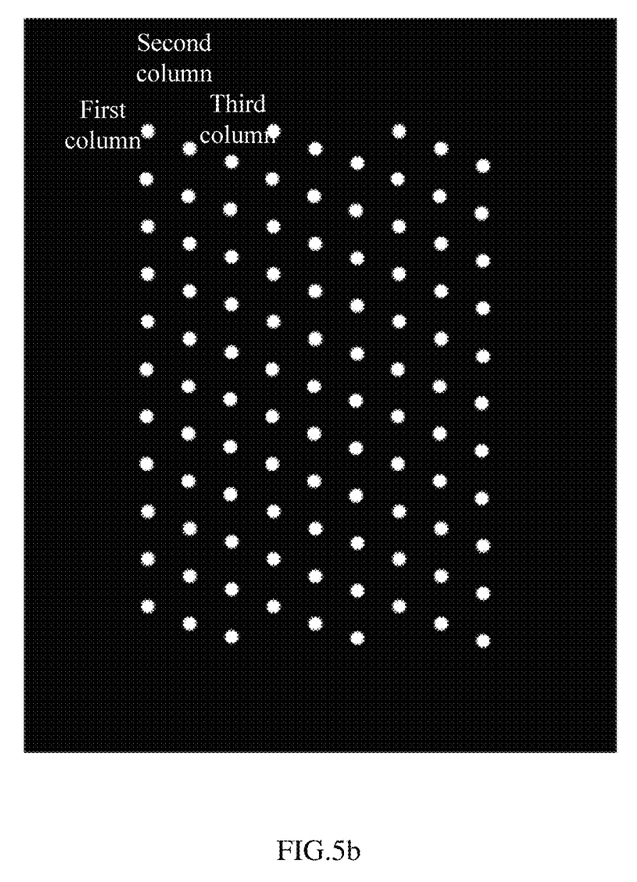
FIG. 5b shows a schematic diagram of a periodically misaligned light-splitting point array according to an embodiment of the present disclosure.

FIG. 5a shows a schematic diagram of a regularly arranged light-splitting point array according to an embodiment of the present disclosure, and the light-splitting point array of the diffractive optical element is arranged in a regular manner. FIG. 5b shows a schematic diagram of a periodic misalignment arrangement according to an embodiment of the present disclosure. Firstly, the light-splitting point array of the diffractive optical element is arranged in a regular manner, as shown in FIG. 5a, and then the signal points in the light-splitting point array are misalignment according to a ⅓ period. As an example, the coordinates of the signal points in the first column are fixed, the coordinates of the signal points in the adjacent second column are longitudinally moved downward by a ⅓ period, and the coordinates of the signal points in the adjacent third column are longitudinally moved by a ⅔ period. The operations are repeated for the signal points in other columns, and finally a ⅓ period misalignment arrangement is formed as shown in FIG. 5b. This is merely an exemplary description, and the periodic misalignment arrangement of the light-splitting point array does not constitute a limitation to the present disclosure.

In step S13, the light-splitting point array is disturbed to reduce the deviation between the actual output light field and the target output light field, and the disturbance amount of the disturbance method is limited to ensure that there is no obvious overlap or gap between adjacent blocks in the speckle array. After the light-splitting point array of the diffractive optical element is regularly arranged or periodically misaligned in step S12, the designed diffractive optical element also exhibits a strong microstructure periodic repetitive characteristic from the macroscopic point of view. In order to reduce the deviation between the actual output light field and the target output light field, the light-splitting point array after conventional scalar point array design is disturbed. The disturbance includes moving at least some of points in the light-splitting point array.

Figure 6:
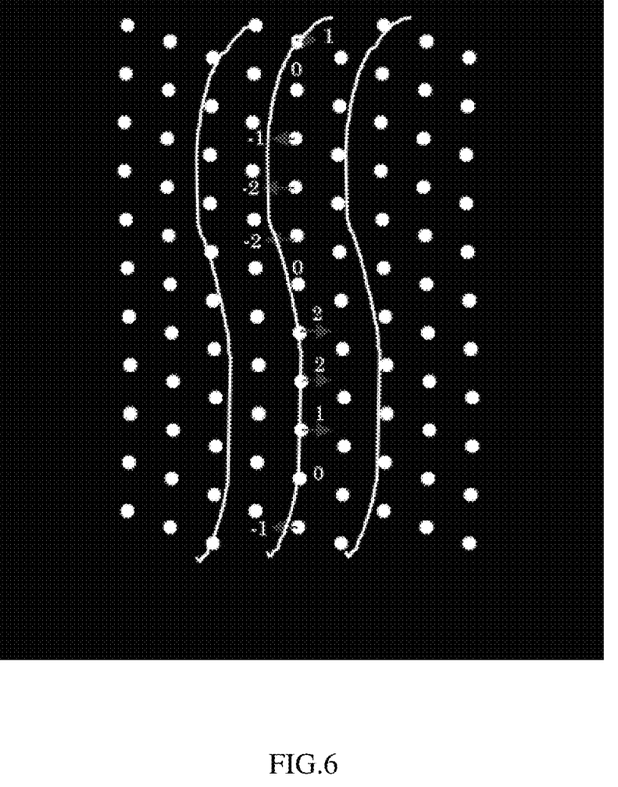
FIG. 6 shows a schematic diagram of a transverse disturbance for a light-splitting point array according to an embodiment of the present disclosure.

FIG. 6 shows a schematic diagram of a disturbance for the light-splitting point array according to an embodiment of the present disclosure. Assuming that the light-splitting point array is first arranged in the regular manner of FIG. 5a, and then some of points in the light-splitting point array are moved. Taking the middle column of signal points as an example, the first point is moved to the right by 1 unit, that is, the amount of disturbance is 1 unit; the third point is moved to the left by 1 unit, that is, the amount of disturbance is 1 unit; the fourth point is moved to the left by 2 units, that is, the amount of disturbance is 2 units; the fifth point is moved to the left by 2 units, that is, the amount of disturbance is 1 unit, and so on, which will not be repeated here. The finally formed light-splitting point array is shown in FIG. 6. Because the amount of disturbance has reached the magnitude of wavelength, the change of the light-splitting point array after the disturbance is not obvious from the macroscopic point of view, but it can effectively reduce the influence of the vector effect on the non-uniformity of the target output light field. Furthermore, the disturbance amount of the disturbance method is limited to ensure that there is no obvious overlap or gap between adjacent blocks in the speckle array. Continuing to refer to FIG. 4, the target output light field is composed of multiple blocks arranged closely together. That is, multiple blocks are obtained by array replication of the point light sources. There is no obvious overlap or gap between adjacent blocks in the target output light field distribution, but the actual output light field distribution will cause an overlap or larger gap between adjacent blocks due to the deviation from the target output light field distribution, thereby increasing the non-uniformity of the speckle array. When designing a diffractive optical element, the deviation between the actual output light field and the target output light field can be reduced by disturbing the light-splitting point array, thereby effectively reducing the non-uniformity of the actual output light field.

According to a preferred embodiment of the present disclosure, step S13 in the design method of the diffractive optical element includes: transversely disturbing the light-splitting point array to reduce the non-uniformity of the actual output light field.

Assuming that the light-splitting point array is first arranged in a regular manner, wherein the coordinates of a certain signal point are $(id\_x1, id\_y1)$, the disturbance is to shift the coordinate position of the signal point to another coordinate $(id\_x2, id\_y2)$ position. Among them, the horizontal coordinate is changed from $id\_x1$ to $id\_x2$, and the difference is the amount of transverse disturbance. If the vertical coordinate $id\_y1=id\_y2$ at this time, the disturbance is a separate transverse disturbance. Preferably, some or all of the signal points in the light-splitting point array can be disturbed transversely to reduce the non-uniformity of the actual output light field.

According to a preferred embodiment of the present disclosure, the amounts of transverse disturbance for at least one column of points in the light-splitting point array are roughly symmetrical around the center of the column.

Continuing to refer to FIG. 6, taking the middle column of signal points as an example, the center point of the column remains stationary, the five points above move transversely in the directions of the arrows shown in the figure, and the five points below also move transversely in the directions of the arrows shown in the figure, then the disturbance amounts of the column are:

[1, 0, −1, −2, −2, 0, 2, 2, 1, 0, −1]

It can be seen that the transverse disturbance amounts of the column are symmetrical around the center of the column. Since the disturbance amount is at the wavelength level, it is not obvious from the macroscopic point of view. To help understanding, a white S-shaped curve is drawn in FIG. 6 to represent the effect of the transverse disturbance. Therefore, the effect of the transverse disturbance can be called "a separate transverse S disturbance."

According to a preferred embodiment of the present disclosure, step S13 in the design method of the diffractive optical element includes: longitudinally disturbing the light-splitting point array to reduce the non-uniformity of the actual output light field.

Assume that the light-splitting point array is first arranged in a regular manner, wherein the coordinates of a certain signal point are $(id\_x1, id\_y1)$, and the disturbance is to shift the coordinate position of the signal point to another coordinate $(id\_x2, id\_y2)$ position. Among them, if the horizontal coordinate satisfies $id\_x1=id\_x2$, and the vertical coordinate is changed from $id\_y1$ to $id\_y2$, the difference is the amount of longitudinal disturbance, and the disturbance is a separate longitudinal disturbance. Preferably, some or all of the signal points in the light-splitting point array can be transversely disturbed to reduce the non-uniformity of the actual output light field.

According to a preferred embodiment of the present disclosure, the amounts of longitudinal disturbance for at least one row of points in the light-splitting point array are roughly symmetrical around the center of the row.

Figure 7:
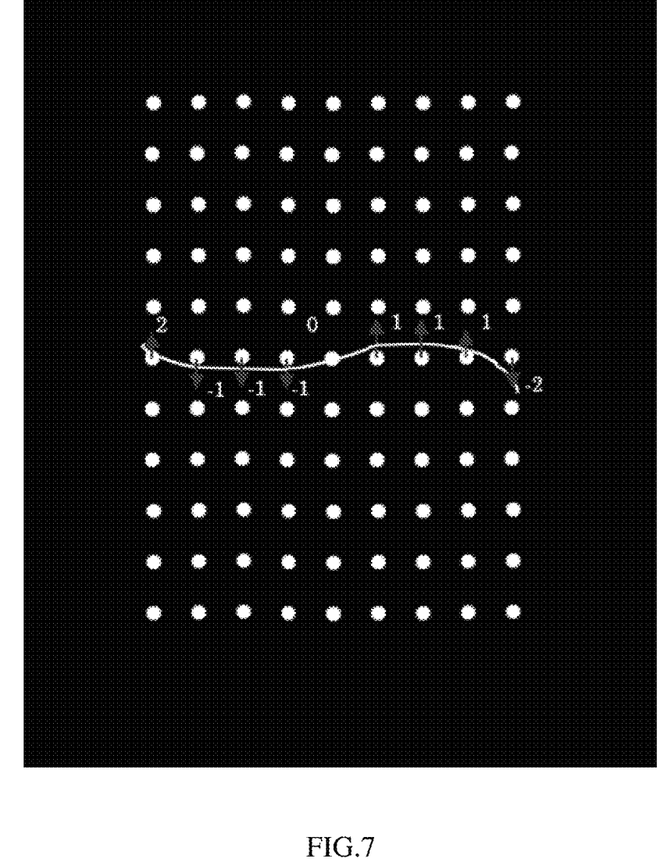
FIG. 7 shows a schematic diagram of a longitudinal disturbance for a light-splitting point array according to an embodiment of the present disclosure.

Referring to FIG. 7, the light-splitting point array is arranged regularly. Taking the middle row of signal points as an example, the center point of the row remains unmovable, and the row is disturbed according to the following disturbance amounts:

[2, −1, −1, −1, 0, 1, 1, 1, −2]

It can be seen that the longitudinal disturbance amounts of the row is symmetrical around the center of the row. Since the disturbance amount is at the wavelength level, it is not obvious from the macroscopic point of view. In order to help understand, a white curve is drawn in FIG. 6 to represent the effect of the longitudinal disturbance. The effect of the longitudinal disturbance is roughly "S" shaped, which can be called "a separate longitudinal S disturbance".

According to a preferred embodiment of the present disclosure, step S13 in the design method of the diffractive optical element includes: disturbing the light-splitting point array transversely and longitudinally to reduce the non-uniformity of the actual output light field.

Referring to FIG. 5a, the light-splitting point array is arranged regularly, and some or all of the signal points therein are bidirectionally disturbed transversely and longitudinally. Referring to the above embodiment, both the horizontal coordinate and the vertical coordinate of the signal point are moved, which will not be repeated here.

According to a preferred embodiment of the present disclosure, the disturbance amounts of respective points in the light-splitting point array are roughly symmetrical around the center of the point array.

Referring to the above embodiment, for example, each column in the light-splitting point array is subjected to a separate transverse S disturbance, and the transverse disturbance amounts of the column are symmetrical around the center of the column; then each row is subjected to a separate longitudinal S disturbance, the longitudinal disturbance amounts of the row are symmetrical around the center of the row, and the final disturbance effect is that the disturbance amounts are symmetrical around the center of the point array. It can be called "a bidirectional S disturbance", which can more efficiently reduce the non-uniformity of the actual output light field.

According to a preferred embodiment of the present disclosure, step S13 in the design method of the diffractive optical element includes: performing a random disturbance on at least some of the points transversely and/or longitudinally to reduce the non-uniformity of the actual output light field.

Compared with the regular disturbance methods of the above-mentioned "separate transverse S disturbance", "separate longitudinal S disturbance" and "bidirectional S disturbance", some or all of points in the light-splitting point array can also be more randomly disturbed, that is, the disturbance amounts are a random matrix, thereby reducing the non-uniformity of the actual output light field.

According to a preferred embodiment of the present disclosure, when the diffractive optical element is quantized in two steps, step S13 further includes: keeping the center point of the light-splitting point array unmovable. That is, under the two-step design condition, the disturbance of each target order needs to maintain the central symmetry characteristic.

According to a preferred embodiment of the present disclosure, when the diffractive optical element is quantized in $2^n$ steps, n being a positive integer greater than 1, the disturbance amounts of the light-splitting point array are non-centrosymmetric. That is, under the design condition of 4 steps, 8 steps or a higher number of steps, the disturbance method does not need to enforce central symmetry.

In step S14, the diffractive optical element is designed by using the scalar GS algorithm according to the disturbed light-splitting point array.

To sum up, the present disclosure can achieve a design of the light-splitting point array with lower uniformity based on the scalar design method by disturbing the regularly arranged or periodic misalignment light-splitting point array. Preferably, in order to further reduce the non-uniformity of the output light field, multiple disturbances can be performed.

Figure 8:
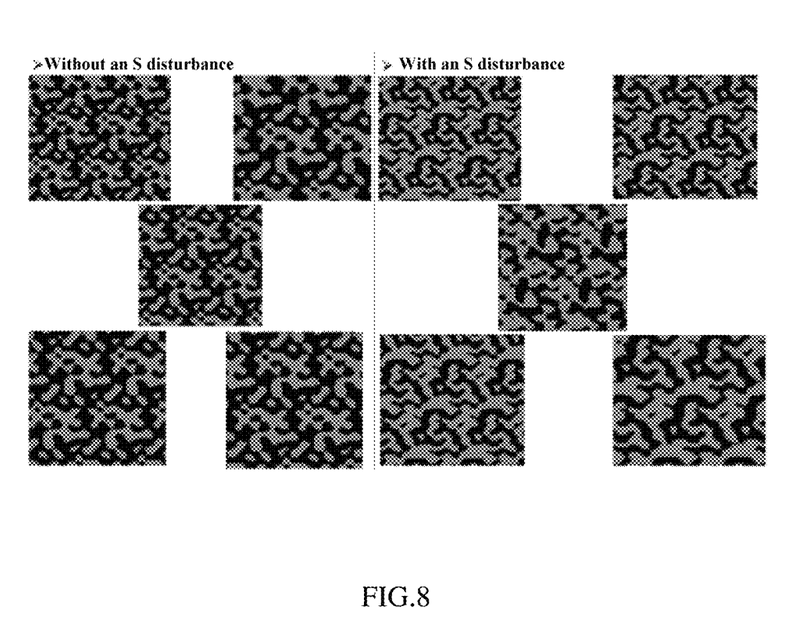
FIG. 8 shows a comparison diagram of output light field distributions without and with an S disturbance according to an embodiment of the present disclosure.

FIG. 8 shows a comparison diagram of the output light field distribution without and with an S disturbance according to an embodiment of the present disclosure. Since the image of the output light field distribution diagram is too large after being enlarged, only the four corners and the central area of the distribution diagram are intercepted herein for comparison and explanation. In the absence of an S disturbance, the four corners and the central area of the actual output light field have a high degree of overlap, and the deviation caused by the vector effect will be periodically amplified; and after adding S disturbance, the similarity of the positions of the four corners and the central area will be lower, and the deviation caused by the vector effect will not be periodically superimposed and amplified, and the theoretical process tolerance will also become larger. It can be seen that the design method of the present disclosure can reduce the impact of the vector effect and reduce the non-uniformity of the output light field.

Figure 9:
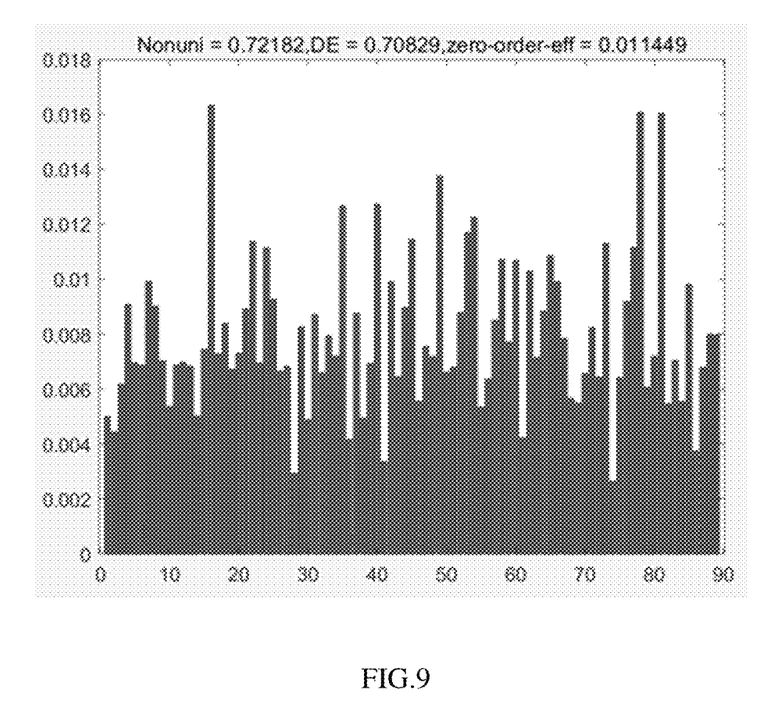
FIG. 9 shows a schematic diagram of the non-uniformity of an output light field without an S disturbance according to an embodiment of the present disclosure.

FIG. 9 shows a schematic diagram of the non-uniformity of the output light field without an S disturbance according to an embodiment of the present disclosure. The simulation result without an S disturbance shows that the non-uniformity of the output light field is 72.182%.

Figure 10:
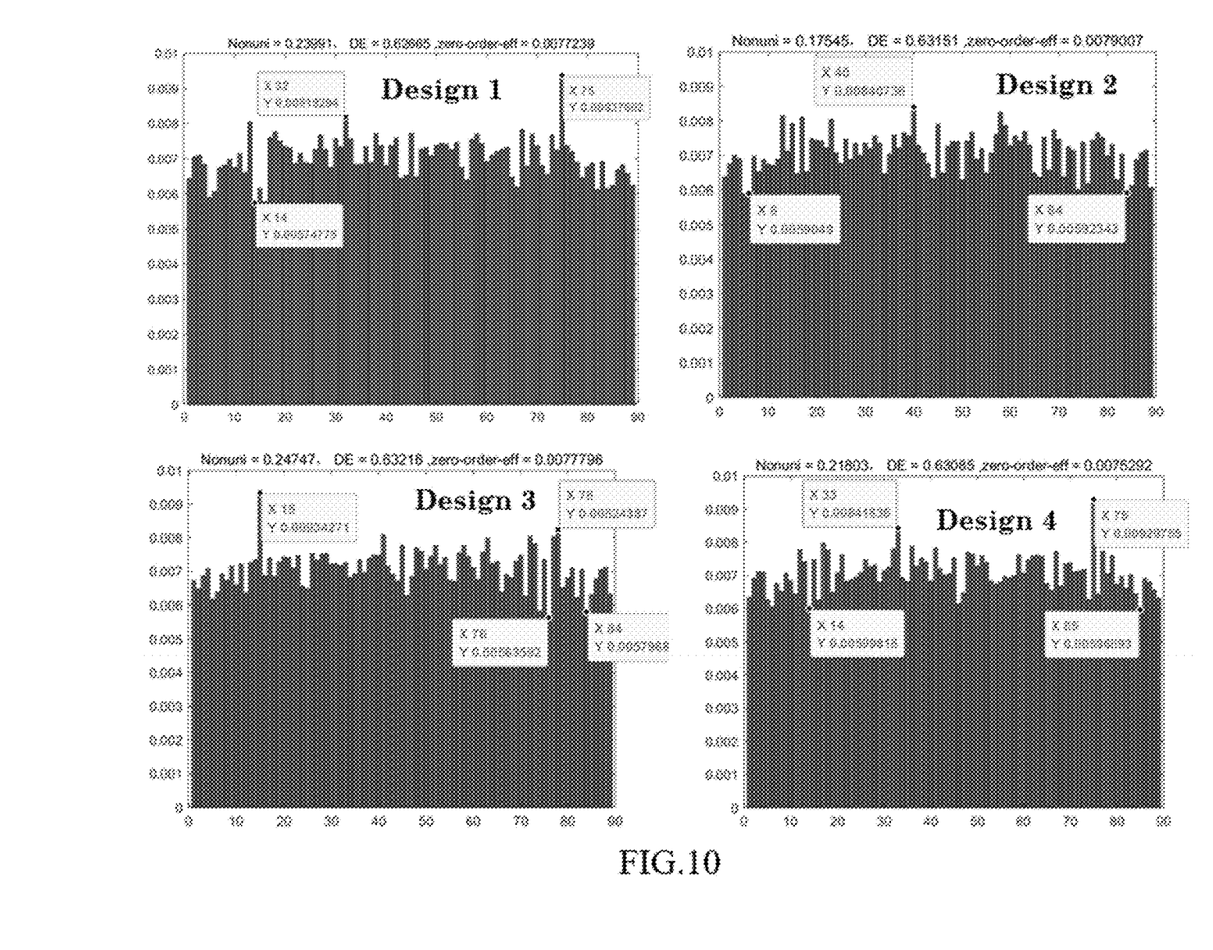
FIG. 10 shows a schematic diagram of the non-uniformity of an output light field with an S disturbance according to multiple embodiments of the present disclosure.

FIG. 10 shows a schematic diagram of the non-uniformity of the output light field with an S disturbance according to multiple embodiments of the present disclosure. The four small figures correspond to the designs of four diffractive optical elements, which have different disturbance parameters added. It can be seen from the drawings that the non-uniformities of the four simulation results are 23.991%, 14.545%, 24.747% and 21.803% respectively. Therefore, the simulation results after adding an S disturbance show that the non-uniformity of the output light field is reduced to less than 25%.

The present disclosure further relates to a diffractive optical element for beam splitting designed according to the above-mentioned design method 10.

The present disclosure further relates to a structured light projector, including:
a VCSEL light source configured to generate laser light; and
a diffractive optical element designed according to the above-mentioned design method 10 and configured to perform beam splitting on the laser light.

The design method of the present disclosure can realize the design of the light-splitting point array with lower non-uniformity based on the scalar design method by disturbing each target order according to the preset condition and then performing a scalar design to construct the light-splitting point array of the diffractive optical element. Therefore, the diffractive optical element designed by the present disclosure can effectively reduce the non-uniformity of the output light field.

Finally, it should be noted that the above is only a preferred embodiment of the present disclosure and is not intended to limit the present disclosure. Although the present disclosure is described in detail with reference to the aforementioned embodiments, it is still possible for those skilled in the art to modify the technical solutions described in the aforementioned embodiments or to replace some of the technical features therein by equivalents. Any modification, equivalent replacement, improvement, etc. made within the spirit and principles of the present disclosure shall be included in the protection scope of the present disclosure.

What is claimed is:

1. A design method for a diffractive optical element for beam splitting, comprising:
S11: determining an input light field distribution and a target output light field distribution of the diffractive optical element, the input light field distribution comprising a parameter and arrangement of a light source, and the target output light field being a speckle array with uniform light splitting or an energy distribution distributed regularly from a center to an edge;
S12: constructing a light-splitting point array of the diffractive optical element, the light-splitting point array being used to perform array replication on the light source to obtain multiple blocks in a speckle array within a specific field of view, and an arrangement of the light-splitting point array being a regular arrangement or a longitudinal and/or transverse periodic misalignment arrangement;
S13: disturbing the light-splitting point array to reduce a deviation between an actual output light field and the target output light field caused by a vector effect, and limiting an amount of disturbance of a disturbing method to ensure that there is no obvious overlap or gap between adjacent blocks in the speckle array; and
S14: designing the diffractive optical element by using a scalar GS algorithm according to the disturbed light-splitting point array;
wherein the disturbing comprises moving at least some of points in the light-splitting point array.

2. The design method according to claim 1, wherein step S13 comprises: disturbing the light-splitting point array transversely to reduce non-uniformity of the actual output light field.

3. The design method according to claim 2, wherein amounts of transverse disturbance for at least one column of points in the light-splitting point array are roughly symmetrical around a center of the column.

4. The design method according to claim 1, wherein step S13 comprises: disturbing the light-splitting point array longitudinally to reduce non-uniformity of the actual output light field.

5. The design method according to claim 4, wherein amounts of longitudinal disturbance for at least one row of points in the light-splitting point array are roughly symmetrical around a center of the row.

6. The design method according to claim 1, wherein step S13 comprises: disturbing the light-splitting point array transversely and longitudinally to reduce non-uniformity of the actual output light field.

7. The design method according to claim 6, wherein amounts of disturbance for respective points in the light-splitting point array are roughly symmetrical around a center of the point array.

8. The design method according to claim 1, wherein step S13 comprises: disturbing randomly at least some of the points transversely and/or longitudinally to reduce non-uniformity of the actual output light field.

9. The design method according to claim 1, wherein when the diffractive optical element is quantized in two steps, step S13 further comprises: keeping a center point of the light-splitting point array unmovable.

10. The design method according to claim 2, wherein when the diffractive optical element is quantized in $2^n$ steps, $n$ being a positive integer greater than 1, amounts of disturbance for the light-splitting point array are non-centrosymmetric.

11. The design method according to claim 1, wherein the target output light field is a speckle array with a distribution of $1:1/(\cos(\theta_i))^P$, and wherein $\theta_i$ is an angle between an i-th light-splitting point and an optical axis.

12. The design method according to claim 1, wherein step S12 comprises: constructing a light-splitting point array of the diffractive optical element, the light-splitting point array being used to perform array replication on a single-point or multi-point VCSEL light source to realize a speckle array within a specific field of view, and the arrangement of the light-splitting point array being a regular arrangement or a longitudinal 1/M and/or transverse 1/N misalignment arrangement, wherein M and N are both positive integers greater than 2.

13. The design method according to claim 1, wherein the input light field is a light field formed by a randomly arranged multi-point VCSEL light source.

14. The design method according to claim 1, wherein step S14 further comprises:
when the input light field is divergent light, superimposing a function of a collimator lens in the diffractive optical element.

15. A diffractive optical element for beam splitting designed according to a design method for a diffractive optical element for beam splitting, the design method comprising:
S11: determining an input light field distribution and a target output light field distribution of the diffractive optical element, the input light field distribution comprising a parameter and arrangement of a light source, and the target output light field being a speckle array with uniform light splitting or an energy distribution distributed regularly from a center to an edge;
S12: constructing a light-splitting point array of the diffractive optical element, the light-splitting point array being used to perform array replication on the light source to obtain multiple blocks in a speckle array within a specific field of view, and an arrangement of the light-splitting point array being a regular arrangement or a longitudinal and/or transverse periodic misalignment arrangement;
S13: disturbing the light-splitting point array to reduce a deviation between an actual output light field and the target output light field caused by a vector effect, and limiting an amount of disturbance of a disturbing method to ensure that there is no obvious overlap or gap between adjacent blocks in the speckle array; and
S14: designing the diffractive optical element by using a scalar GS algorithm according to the disturbed light-splitting point array;
wherein the disturbing comprises moving at least some of points in the light-splitting point array.

16. A structured light projector, comprising:
a VCSEL light source configured to generate laser light; and
a diffractive optical element designed according to a design method for a diffractive optical element for beam splitting and configured to perform beam splitting on the laser light, the design method comprising:
S11: determining an input light field distribution and a target output light field distribution of the diffractive optical element, the input light field distribution comprising a parameter and arrangement of a light source, and the target output light field being a speckle array with uniform light splitting or an energy distribution distributed regularly from a center to an edge;

S12: constructing a light-splitting point array of the diffractive optical element, the light-splitting point array being used to perform array replication on the light source to obtain multiple blocks in a speckle array within a specific field of view, and an arrangement of the light-splitting point array being a regular arrangement or a longitudinal and/or transverse periodic misalignment arrangement;

S13: disturbing the light-splitting point array to reduce a deviation between an actual output light field and the target output light field caused by a vector effect, and limiting an amount of disturbance of a disturbing method to ensure that there is no obvious overlap or gap between adjacent blocks in the speckle array; and S14: designing the diffractive optical element by using a scalar GS algorithm according to the disturbed light-splitting point array;

wherein the disturbing comprises moving at least some of points in the light-splitting point array.

17. The diffractive optical element according to claim 15, wherein step S13 comprises: disturbing the light-splitting point array transversely to reduce non-uniformity of the actual output light field.

18. The diffractive optical element according to claim 17, wherein amounts of transverse disturbance for at least one column of points in the light-splitting point array are roughly symmetrical around a center of the column.

19. The structured light projector according to claim 16, wherein step S13 comprises: disturbing the light-splitting point array transversely to reduce non-uniformity of the actual output light field.

20. The structured light projector according to claim 19, wherein amounts of transverse disturbance for at least one column of points in the light-splitting point array are roughly symmetrical around a center of the column.

* * * * *